US009344942B2

(12) United States Patent
Santhanam et al.

(10) Patent No.: US 9,344,942 B2
(45) Date of Patent: May 17, 2016

(54) APPLICATION-LAYER HANDOFF OF AN ACCESS TERMINAL FROM A FIRST SYSTEM OF AN ACCESS NETWORK TO A SECOND SYSTEM OF THE ACCESS NETWORK DURING A COMMUNICATION SESSION WITHIN A WIRELESS COMMUNICATIONS SYSTEM

(71) Applicant: QUALCOMM Incorporated, San Diego, CA (US)

(72) Inventors: Arvind V. Santhanam, San Diego, CA (US); Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 148 days.

(21) Appl. No.: 13/750,029

(22) Filed: Jan. 25, 2013

(65) Prior Publication Data

US 2013/0136052 A1 May 30, 2013

Related U.S. Application Data

(63) Continuation of application No. 12/693,099, filed on Jan. 25, 2010, now abandoned.

(51) Int. Cl.
*H04W 4/00* (2009.01)
*H04W 36/30* (2009.01)
(Continued)

(52) U.S. Cl.
CPC .............. *H04W 36/30* (2013.01); *H04W 36/14* (2013.01); *H04W 80/12* (2013.01)

(58) Field of Classification Search
None
See application file for complete search history.

(56) References Cited

U.S. PATENT DOCUMENTS 6,321,090 B1 11/2001 Soliman
7,042,865 B1  5/2006 Meier et al.
7,272,122 B2  9/2007 Trossen et al.
(Continued)

FOREIGN PATENT DOCUMENTS

EP 1898564 A1 3/2008
EP 2584757 A1 4/2013
(Continued)

OTHER PUBLICATIONS

International Search Report and Written Opinion—PCT/US2011/022007, ISA/EPO—May 3, 2011.
(Continued)

*Primary Examiner* — Steven H Nguyen
(74) *Attorney, Agent, or Firm* — Raphael Freiwirth; Michael F. Taveira

(57) ABSTRACT

Embodiments are directed to an application-layer handoff of an access terminal from a first system of an access network to a second system of the access network during a communication session within a wireless communications system. In an embodiment, the access terminal sets up a communication session on the first system. A multimedia client measures application-layer performance parameters for the communication session supported by the first system, and determines whether to handoff the communication session to a second system based at least in part on the application-layer performance parameters. If the multimedia client determines to handoff the communication session to the second system, the multimedia client initiates the handoff and the communication session is transitioned to the second system.

33 Claims, 11 Drawing Sheets

(51) Int. Cl.
*H04W 36/14* (2009.01)
*H04W 80/12* (2009.01)

(56) References Cited

U.S. PATENT DOCUMENTS

| | | |
|---|---|---|
| 7,313,628 B2 | 12/2007 | Chaskar et al. |
| 7,480,307 B2 | 1/2009 | Chaskar et al. |
| 8,068,833 B2 | 11/2011 | Trossen |
| 2003/0193910 A1* | 10/2003 | Shoaib et al. ............... 370/331 |
| 2004/0023669 A1 | 2/2004 | Reddy |
| 2005/0043026 A1 | 2/2005 | Brok et al. |
| 2005/0250496 A1 | 11/2005 | Hason et al. |
| 2005/0281270 A1 | 12/2005 | Kossi et al. |
| 2007/0091889 A1 | 4/2007 | Xiao et al. |
| 2008/0049675 A1 | 2/2008 | Burgan et al. |
| 2008/0096560 A1 | 4/2008 | Felske et al. |
| 2008/0307041 A1 | 12/2008 | Bouazizi et al. |
| 2009/0023453 A1* | 1/2009 | Hu et al. .................... 455/452.1 |
| 2009/0059899 A1 | 3/2009 | Bendelac |
| 2009/0077247 A1 | 3/2009 | Bouazizi et al. |
| 2009/0291686 A1* | 11/2009 | Alpert et al. ................. 455/436 |
| 2009/0316615 A1 | 12/2009 | Vedantham et al. |
| 2009/0319824 A1 | 12/2009 | Liu et al. |
| 2010/0061285 A1 | 3/2010 | Maeda et al. |
| 2010/0197265 A1* | 8/2010 | Dorenbosch et al. ....... 455/404.1 |
| 2010/0323704 A1* | 12/2010 | Tailor et al. ................. 455/438 |
| 2011/0182272 A1 | 7/2011 | Santhanam et al. |
| 2011/0249607 A1 | 10/2011 | Ishikura et al. |
| 2012/0269075 A1 | 10/2012 | Fernandes et al. |
| 2014/0119267 A1 | 5/2014 | Santhanam et al. |

FOREIGN PATENT DOCUMENTS

| | | |
|---|---|---|
| JP | 200264849 | 2/2002 |
| JP | 2003333639 A | 11/2003 |
| JP | 2005516546 A | 6/2005 |
| JP | 2007515826 A | 6/2007 |
| JP | 2007184980 A | 7/2007 |
| JP | 2007519364 A | 7/2007 |
| JP | 2008510394 A | 4/2008 |
| JP | 2008104190 A | 5/2008 |
| JP | 2010508709 A | 3/2010 |
| WO | 03065682 A1 | 8/2003 |
| WO | 2005027556 A1 | 3/2005 |
| WO | 2008040021 A1 | 4/2008 |
| WO | 2008054800 A2 | 5/2008 |
| WO | 2008081816 A1 | 7/2008 |
| WO | WO 2009078675 A1 * | 6/2009 |
| WO | WO 2010100315 A1 * | 9/2010 |
| WO | WO-2010111469 A2 | 9/2010 |
| WO | WO-2011091223 A2 | 7/2011 |

OTHER PUBLICATIONS

Liebsch, et al., "Candidate Access Router Discovery", The Internet Society, Jul. 2005, pp. 1-46.

* cited by examiner

APPLICATION-LAYER HANDOFF OF AN ACCESS TERMINAL FROM A FIRST SYSTEM OF AN ACCESS NETWORK TO A SECOND SYSTEM OF THE ACCESS NETWORK DURING A COMMUNICATION SESSION WITHIN A WIRELESS COMMUNICATIONS SYSTEM

CROSS REFERENCE TO RELATED APPLICATIONS

This application is a Continuation of U.S. patent application Ser. No. 12/693,099 filed Jan. 25, 2010, entitled "APPLICATION-LAYER HANDOFF OF AN ACCESS TERMINAL FROM A FIRST SYSTEM OF AN ACCESS NETWORK TO A SECOND SYSTEM OF THE ACCESS NETWORK DURING A COMMUNICATION SESSION WITHIN A WIRELESS COMMUNICATIONS SYSTEM", which is by the inventors of the subject application, is assigned to the assignee hereof and is incorporated herein by reference in its entirety.

BACKGROUND OF THE INVENTION

1. Field of the Invention

Embodiments of the present invention are directed to an application-layer handoff of an access terminal from a first system of an access network to a second system of the access network during a communication session within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal. A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

Embodiments are directed to an application-layer handoff of an access terminal from a first system of an access network to a second system of the access network during a communication session within a wireless communications system. In an embodiment, the access terminal sets up a communication session on the first system. A multimedia client measures application-layer performance parameters for the communication session supported by the first system, and determines whether to handoff the communication session to a second system based at least in part on the application-layer performance parameters. If the multimedia client determines to handoff the communication session to the second system, the multimedia client initiates the handoff and the communication session is transitioned to the second system.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
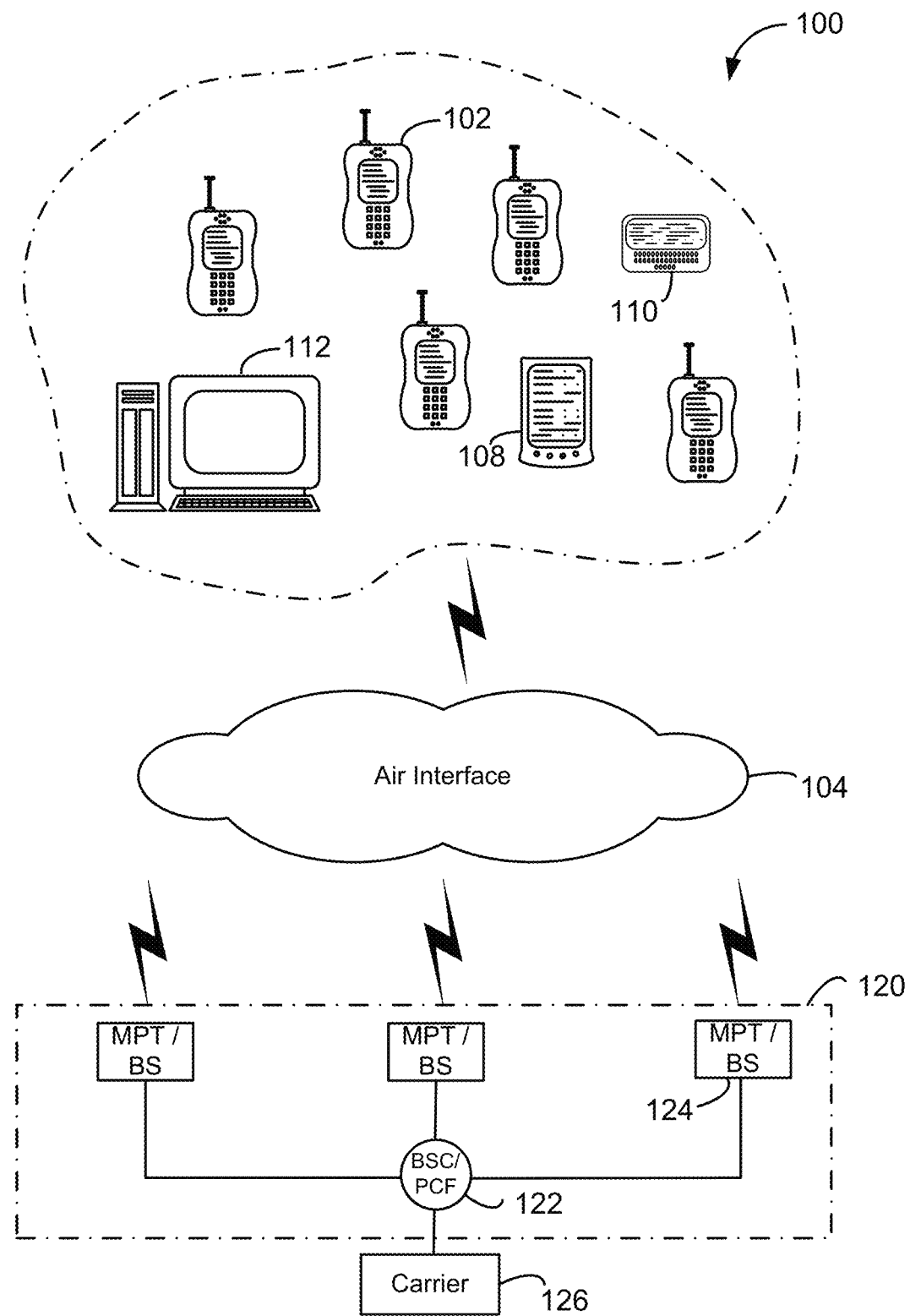
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node 100 ("PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
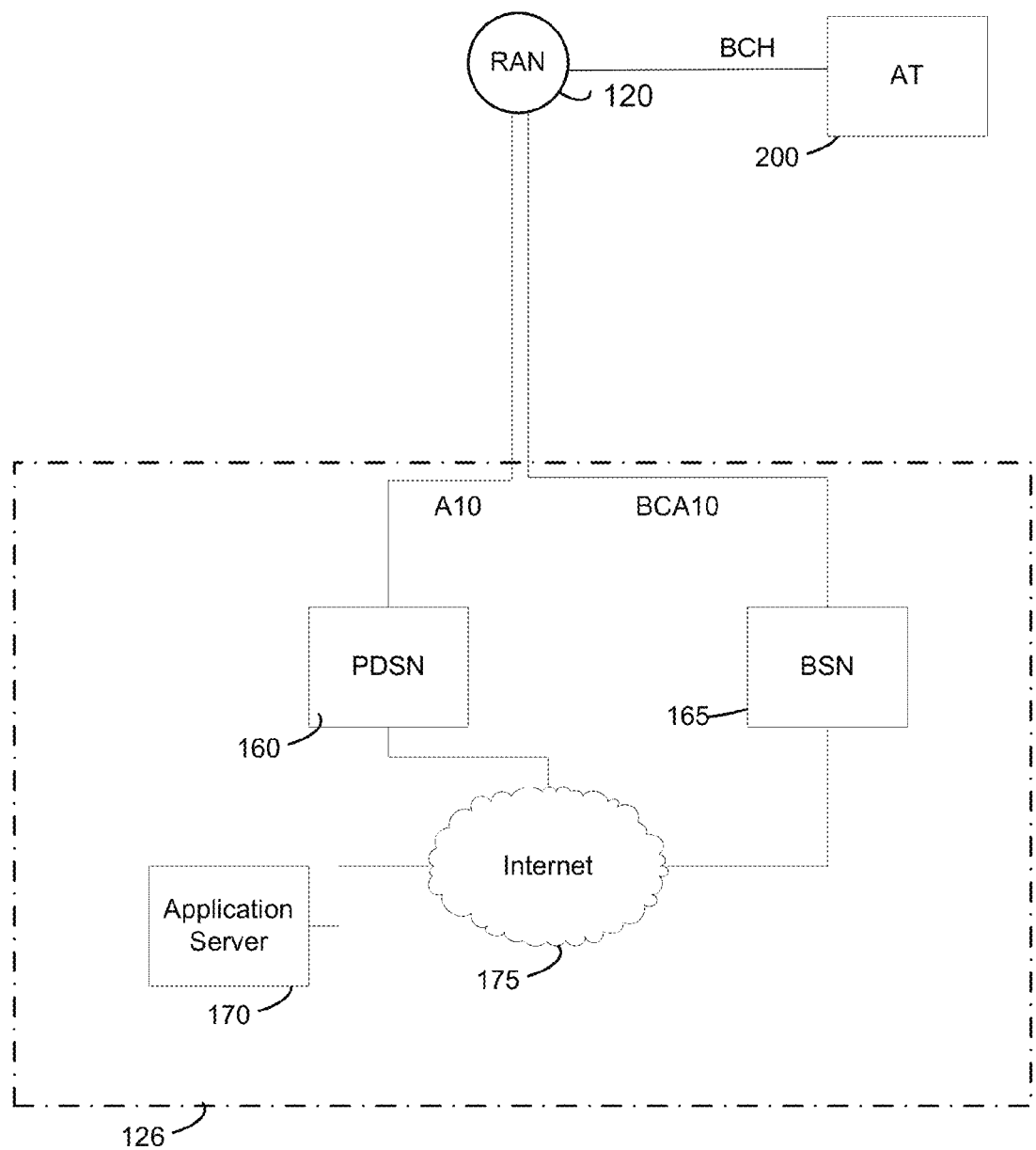
FIG. 2A illustrates the core network of FIG. 1 according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
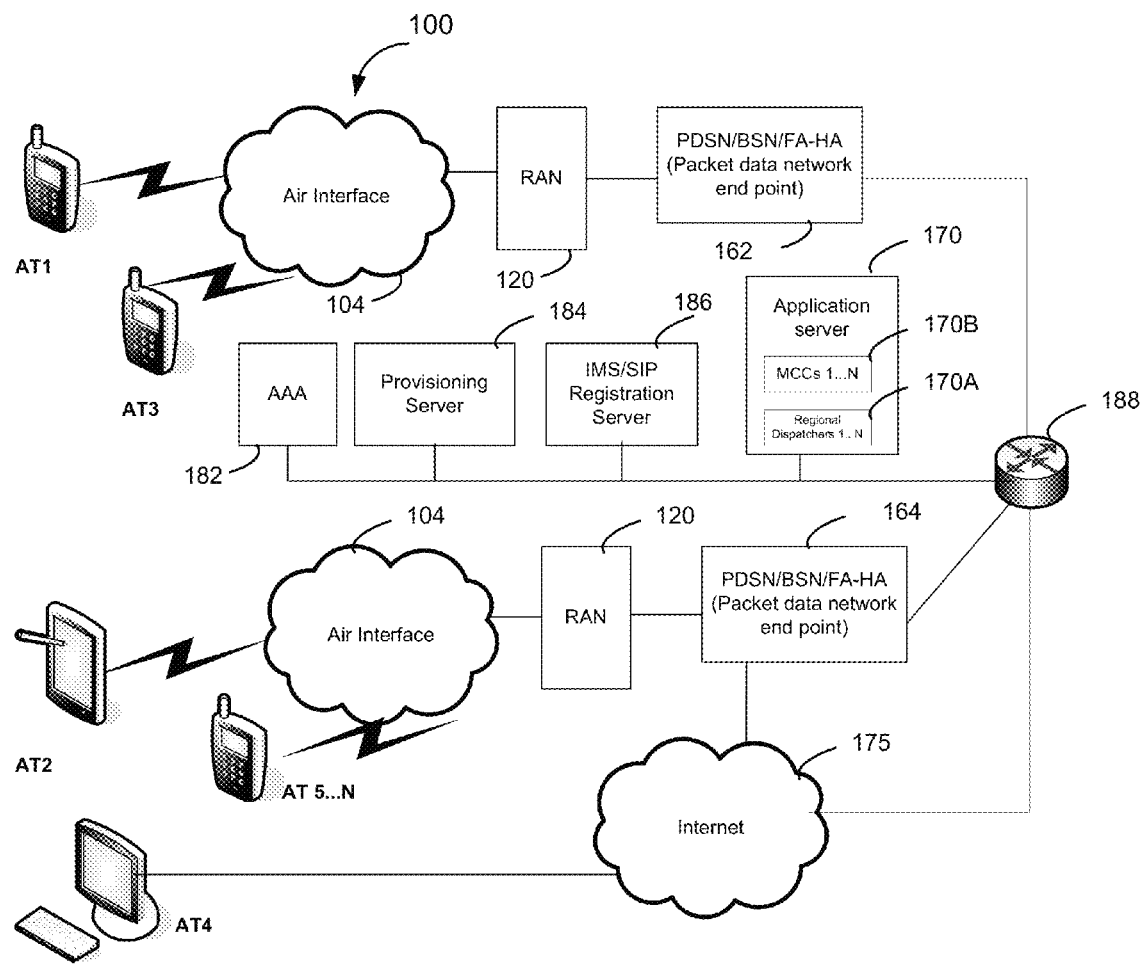
FIG. 2B illustrates an example of the wireless communications system of FIG. 1 in more detail.

FIG. 2B illustrates an example of the wireless communication 100 of FIG. 1 in more detail. In particular, referring to FIG. 2B, ATs 1 . . . N are shown as connecting to the RAN 120 at locations serviced by different packet data network endpoints. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between ATs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the ATs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
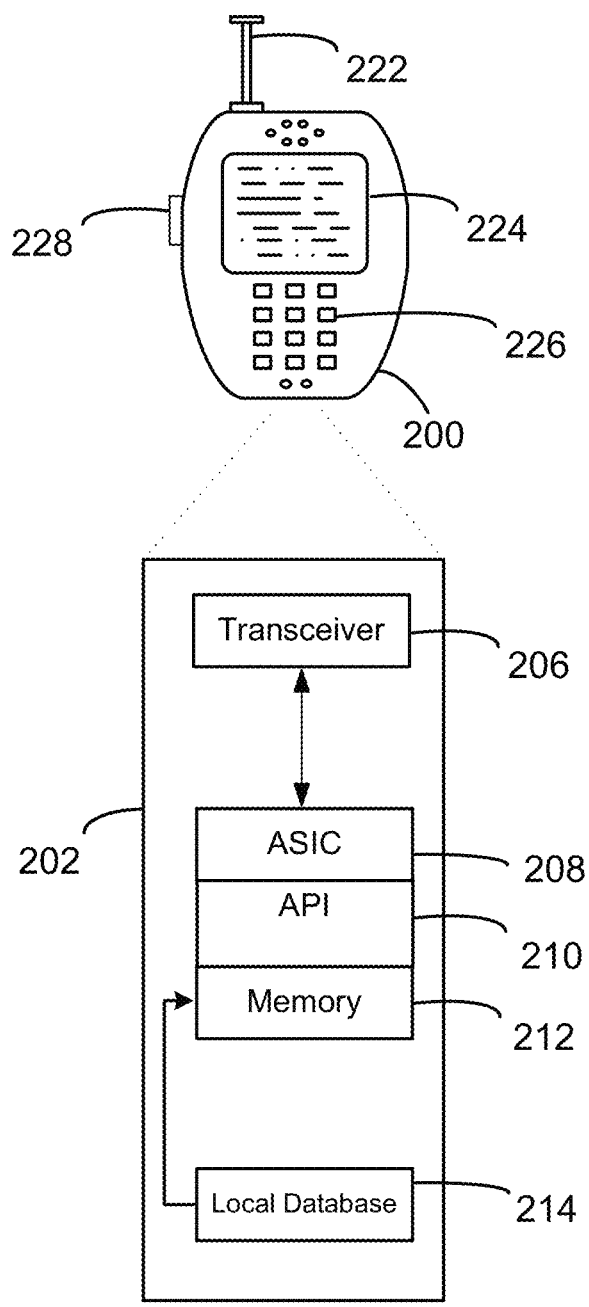
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface ("API") 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 to access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Access terminals can be configured to connect to servers, such as the application server 170, through one of a plurality of systems or networks. For example, a given access terminal can connect to the application server 170 via a WiFi system (e.g., 802.11a/b, etc.), a CDMA2000 1x system, a Wideband CDMA (WCDMA) system, a FDMA system, a TDMA system, a OFDM system, a long-term evolution (LTE) system, a BCMCS system by which the RAN 120 transmits messages to multiple ATs within a given sector on a shared downlink channel, such as a broadcast channel (BCH), a multimedia broadcast/multicast services (MBMS) system and/or a unicast 1x EV-DO system by which the RAN 120 transmits messages to a single AT on a downlink dedicated channel (DCH) or unicast channel. Accordingly, the term 'system' as used herein, in the context of providing service to an access terminal through the RAN 120, corresponds to any type of wireless technology through which the access terminal can establish a link to other network components, such as the application server 170.

The access terminal can setup a communication session (e.g., a push-to-talk (PTT) session, a VoIP session, a half-duplex session, a full-duplex session, etc.) on a first system, and can later switch from the first system to a second system without terminating the communication session. This type of switch can be referred to as an inter-system handover or handoff. An inter-system handoff of the access terminal between systems (e.g., EV-DO, 1x, BCMCS, cdma2000 1X, etc.) should not be confused with a handoff of the access terminal from one serving area (e.g., a cell, sector, subnet, etc.) to another serving area. In other words, the access terminal can handoff from one type of system providing service to another type of system, and the access terminal can also (separately) handoff from one service area for a particular system to another service area for the same system. Embodiments of the invention are generally directed to inter-system handoff, although this does not preclude a serving-area handoff from occurring in conjunction with the embodiments described herein.

Handoffs of the access terminal from one system (e.g., BCMCS) to another system (e.g., 1x, unicast EV-DO, etc.) are conventionally controlled at the AT with software that operates at a lower-layer, such as the physical layer. This software construct may be referred to as a lower layer controller, and may be stored in memory 212 and executed by the ASIC 208. In an example, the lower layer controller can base handoff-decisions on physical layer parameters, such as frame-error-rate (FER), pilot signal strength, detection of a new system, etc. Generally, this means the lower layer controller evaluates how well packets containing data are exchanged on a packet-by-packet or physical frame-by-frame basis, without taking into account the higher-level or application-layer uses of the actual data. Furthermore, inter-system handoff generally requires complex signaling exchanges between the AT and the RAN 120 in order to command the related measurements, report the results, and transmit handoff commands in a seamless manner.

Figure 4:
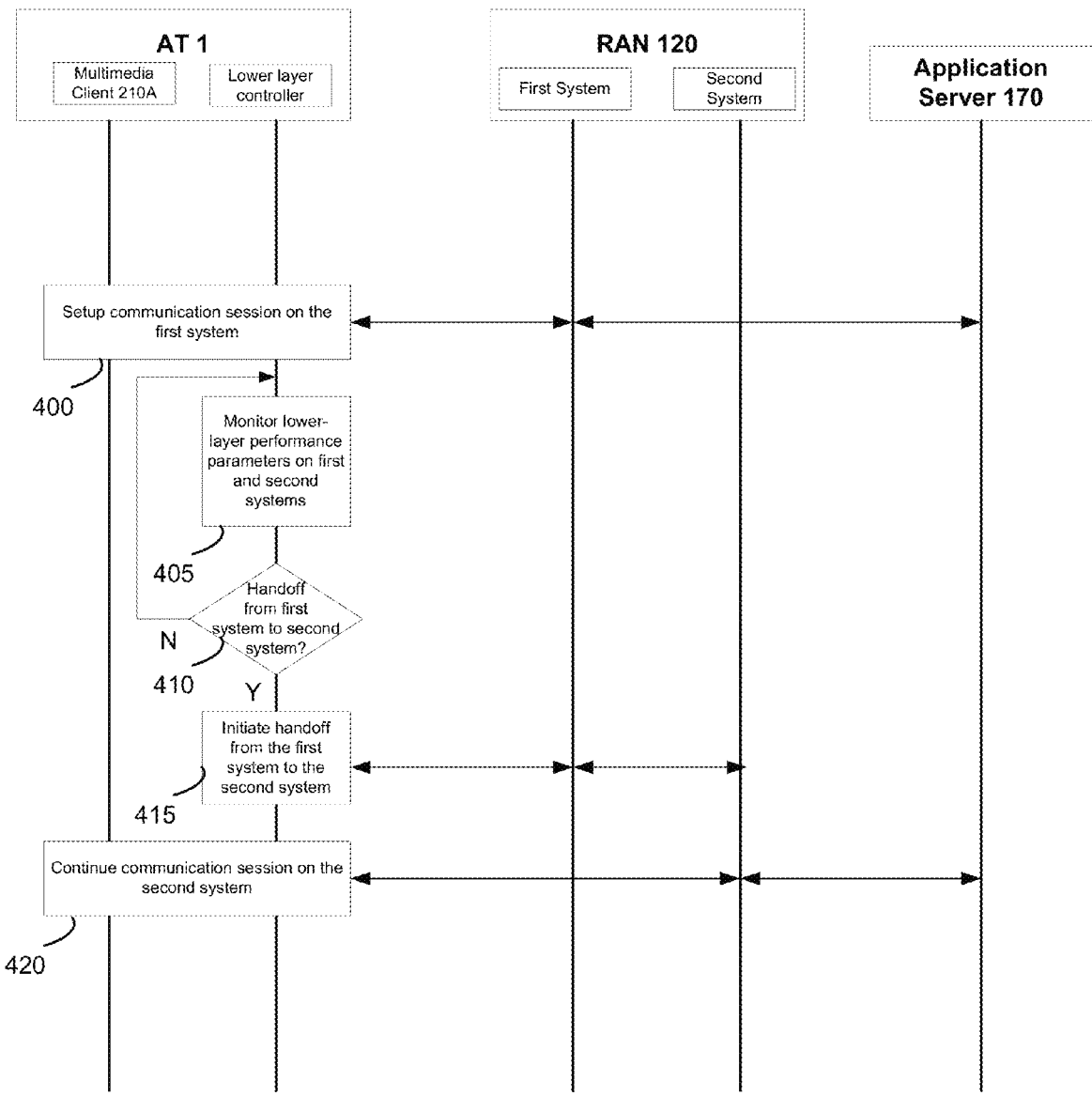
FIG. 4 illustrates a conventional inter-system handoff of a given access terminal that is participating in a wireless communication session.

FIG. 4 illustrates a conventional inter-system handoff of a given access terminal ("AT 1") that is participating in a wireless communication session. Referring to FIG. 4, assume that AT 1 is configured to connect to the RAN 120 on either a first system or a second system. For convenience of explanation, assume that the first system corresponds to generally to EV-DO and the second system corresponds to BCMCS.

Referring to FIG. 4, AT 1 sets up a communication session on the first system, 400. For example, if the communication session corresponds to a PTT session originated by AT 1, a multimedia client 210A that is responsible for managing AT 1's PTT session at the application-layer receives an indication that a user of AT 1 has pushed a PTT button. The multimedia client 210A then requests the lower layer controller to schedule and send a call message to the application server 170. After obtaining or waiting for the requisite call resources, the lower layer controller sends the call message to the RAN 120 (e.g., on a reverse link access channel or a R-TCH), which is forwarded to the application server 170, which announces the session to one or more target ATs and then sends a floor-grant to AT 1 after at least one target AT accepts the announced session.

While the communication session is conducted on the first system, the lower layer controller monitors one or more lower-layer performance parameters associated with the communication session, 405. For example, the one or more lower-layer performance parameters may include a frame-error-rate (FER) for packets associated with the communication session. Alternatively or additionally, the lower layer controller may monitor a pilot signal strength of the first system.

Based on the monitored one or more lower-layer performance parameters, the lower layer controller determines whether to trigger a handoff of AT 1 from the first system to the second system, 410. For example, if the lower layer controller is configured to make handoff decisions between systems for AT 1 based on FER, then the decision of 410 may correspond to comparing a current FER or running-average FER for AT 1's communication session on the first system with a threshold FER, and then selectively triggering a handoff if the current or running-average FER is higher than the threshold FER.

If the lower layer controller of AT 1 determines not to handoff to the second system in 410, the process returns to 405 and AT 1 continues to monitor the one or more lower-layer performance parameters while the communication session continues on the first system. Otherwise, if the lower layer controller of AT 1 determines to handoff to the second system in 410, the lower layer controller initiates or triggers the handoff of AT 1 from the first system to the second system, as is known in the art, 415. For example, if the first system is BCMCS and the second system is unicast EV-DO, then the handoff to the second system may include requesting a unicast TCH and de-registering with the RAN 120 for multicast support via BCMCS. The particular signaling that occurs to facilitate the handoff in 415 is not shown because this signaling can be different for handoffs between different systems of the RAN 120 (e.g., EV-DO to 1x, BCMCS to unicast EV-DO, unicast EV-DO to WiFi, etc.). After completing the handoff that is initiated in 415, AT 1 continues the communication session on the second system, if possible, 420.

It should be noted that many systems do not support inter-system lower layer signaling. Even if such systems do, inter-system handoff is conventionally restricted to/from a restricted set of systems. For these reasons, supporting the inter-system handoff at the lower layer can require significant enhancements to the existing systems. On the other hand, the application-initiated inter-system handoff can be implemented using existing layer signaling messages without requiring any system enhancements. Specific mechanisms for initiating the inter-system handoff at the application layer will be elaborated later.

As will be appreciated by one of ordinary skill in the art, the process of FIG. 4 can potentially permit AT 1 to handoff to another system with superior physical-layer performance characteristics in the event of physical-layer performance degradation on a current system. In the absence of lower layer support, it is possible that the degraded performance related to the communication session at the application-level and the existence of an alternative system can trigger an application-driven inter-system handoff. For example, the communication session may undergo a relatively high media-error-rate (MER) and/or outage duration (OD), which occurs at the application-level. If the application finds availability of an alternative/second system, the application may attempt to handoff to the second system. In another example, if an access terminal is supported by a system with a higher charging rate than another available system (e.g., the AT is connected to a cellular network and hands off to a roaming service area, a free WiFi connection becomes available while the AT is connected to an in-network cellular system that is costing a user thereof usage minutes, etc.), the user thereof may wish to handoff to the cheaper system. Accordingly, embodiments of the invention are generally directed to making system handoff decisions based on one or more application-layer criteria either in place of or in addition to lower-layer (e.g., physical-layer) considerations as in FIG. 4.

Figure 5:
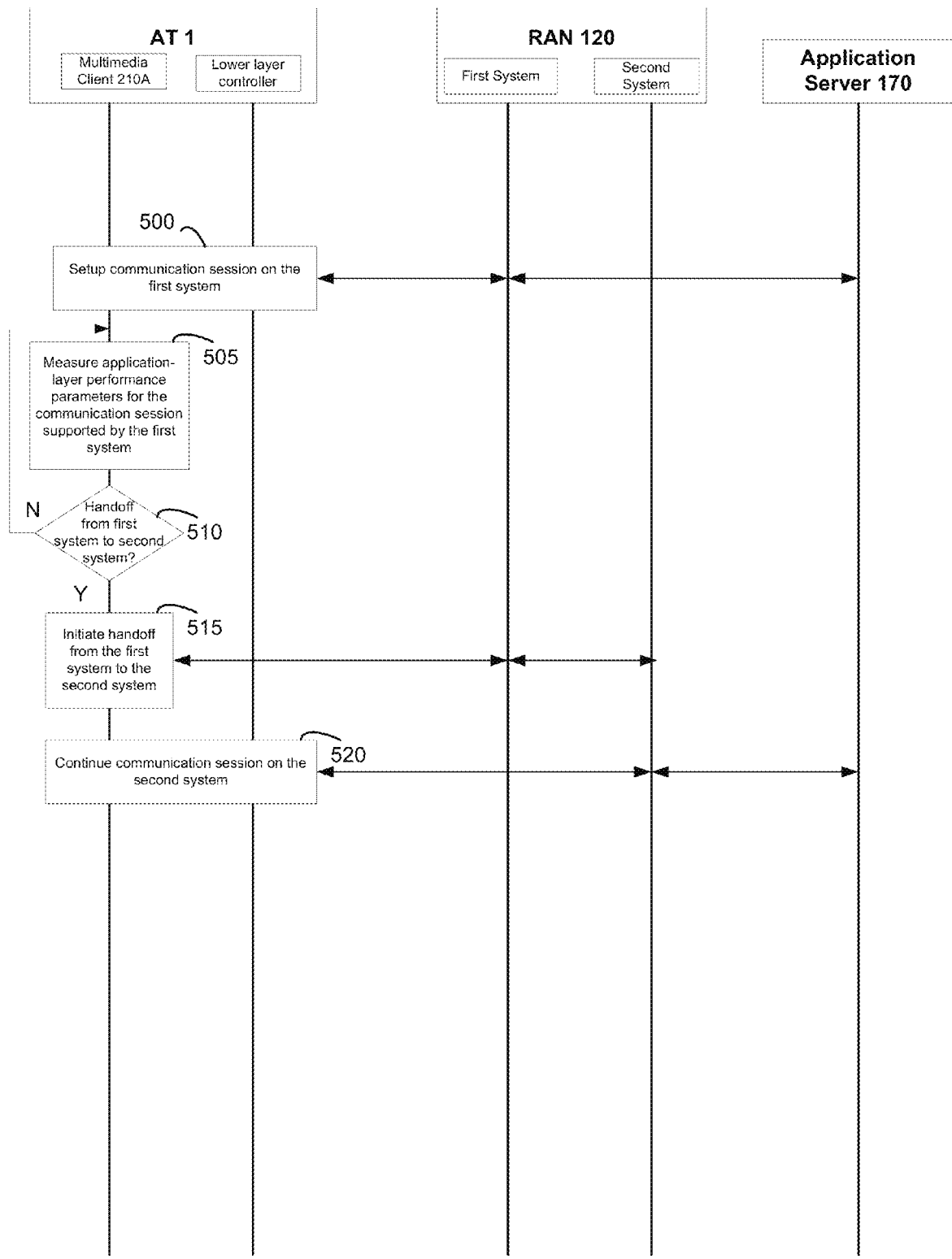
FIG. 5 illustrates a system-handoff of a given access terminal that is participating in a wireless communication session in accordance with an embodiment of the invention.

FIG. 5 illustrates a system-handoff of a given access terminal ("AT 1") that is participating in a wireless communication session in accordance with an embodiment of the invention. In particular, FIG. 5 illustrates the inventive inter-system handoff process at a relatively high level, with examples of more detailed implementations provided afterwards with respect to FIGS. 6A through 6E. Referring to FIG. 5, assume that AT 1 is configured to connect to the RAN 120 on at least two systems or wireless connection technologies (e.g., EV-DO, BCMCS, 1x, WiFi, Bluetooth, etc.).

Referring to FIG. 5, AT 1 sets up a communication session on the first system, 500. For example, if the communication session corresponds to a PTT session originated by AT 1, a multimedia client 210A that is responsible for managing AT 1's PTT session at the application-layer receives an indication that a user of AT 1 has pushed a PTT button. The multimedia client 210A then requests the lower layer controller to schedule and send a call message to the application server 170. After obtaining or waiting for the requisite call resources, the lower layer controller sends the call message to the RAN 120 (e.g., on a reverse link access channel or a R-TCH), which is forwarded to the application server 170, which announces the session to one or more target ATs and then sends a floor-grant to AT 1 after at least one target AT accepts the announced session.

While not illustrated in FIG. 5, while the communication session is conducted on the first system, the lower layer controller can monitor one or more lower-layer performance parameters associated with the communication session as in FIG. 4, and the lower layer controller can initiate handoffs based on the lower-layer or physical-layer performance of the different systems. However, in FIG. 5, performance at the physical-layer need not be the only type of performance considered in determining whether to handoff from one system to another.

Accordingly, the multimedia client 210A measures one or more application-layer performance parameters for the communication system that is being supported by the first system of the RAN 120, 505. For example, the one or more application-layer performance parameters can include (i) a media-error-rate (MER) of the communication session (e.g., based on a success rate of audio frames if the communication session is an audio session, based on a success rate of video and/or audio frames if the communication session is a video conference), (ii) an outage duration (OD) of the communication session (e.g., a period of downlink inactivity due to successive media errors on the communication session), (iii) a rate at which the first system is currently charging a user of AT 1 for usage related to the communication session), (iv) the multimedia client's 210A status as floor-holder or listener if the communication corresponds to a half-duplex PTT session, (v) a priority of the user of AT 1 (e.g., such that a priority of a user of AT 1 is evaluated, and a handoff to a system with superior application-layer performance is only performed if the user's priority is sufficient to permit using the target system for a current application), and/or (vi) any combination thereof.

Based on the monitored one or more application-layer performance parameters, the multimedia client 210A determines whether to trigger a handoff of AT 1 from the first system to the second system, 510. The determination of 510 may not only be based upon the application-layer performance parameter(s) for the communication session on the first system, but can also be based on the availability of one or more other systems, an expected application-layer performance of any available systems, etc. Examples of the application-layer system handoff decision block of 510 are given below with respect to FIGS. 6A through 6E.

If the multimedia client 210A of AT 1 determines not to handoff to the second system in 510, the process returns to 505 and AT 1 continues to monitor the one or more lower-layer performance parameters while the communication session continues on the first system. Otherwise, if the multimedia client 210A of AT 1 determines to handoff to the second system in 510, the multimedia client 210A initiates or triggers the handoff of AT 1 from the first system to the second system, as is known in the art, 515. In general, the signaling that occurs to facilitate the handoff in 515 includes releasing the connection with the first system and establishing the connection with the second system. This is not shown explicitly in FIG. 5 because this signaling can be different for different systems of the RAN 120 (e.g., EV-DO to 1x, BCMCS to unicast EV-DO, unicast EV-DO to WiFi, etc.). After completing the handoff that is initiated in 515, AT 1 continues the communication session on the second system, if possible, 520.

As will be appreciated by one of ordinary skill in the art from a review of FIG. 5, the multimedia client 210A has access to higher-level information regarding the communication session as compared to the lower layer controller. As such, the multimedia client 210A can potentially be in a better position to evaluate whether a system handoff is called for by taking into account performance of the communication session at the application layer, and not merely the physical layer. More detailed implementation examples of the process of FIG. 5 will now be provided with respect to FIGS. 6A through 6E.

Figure 6A:
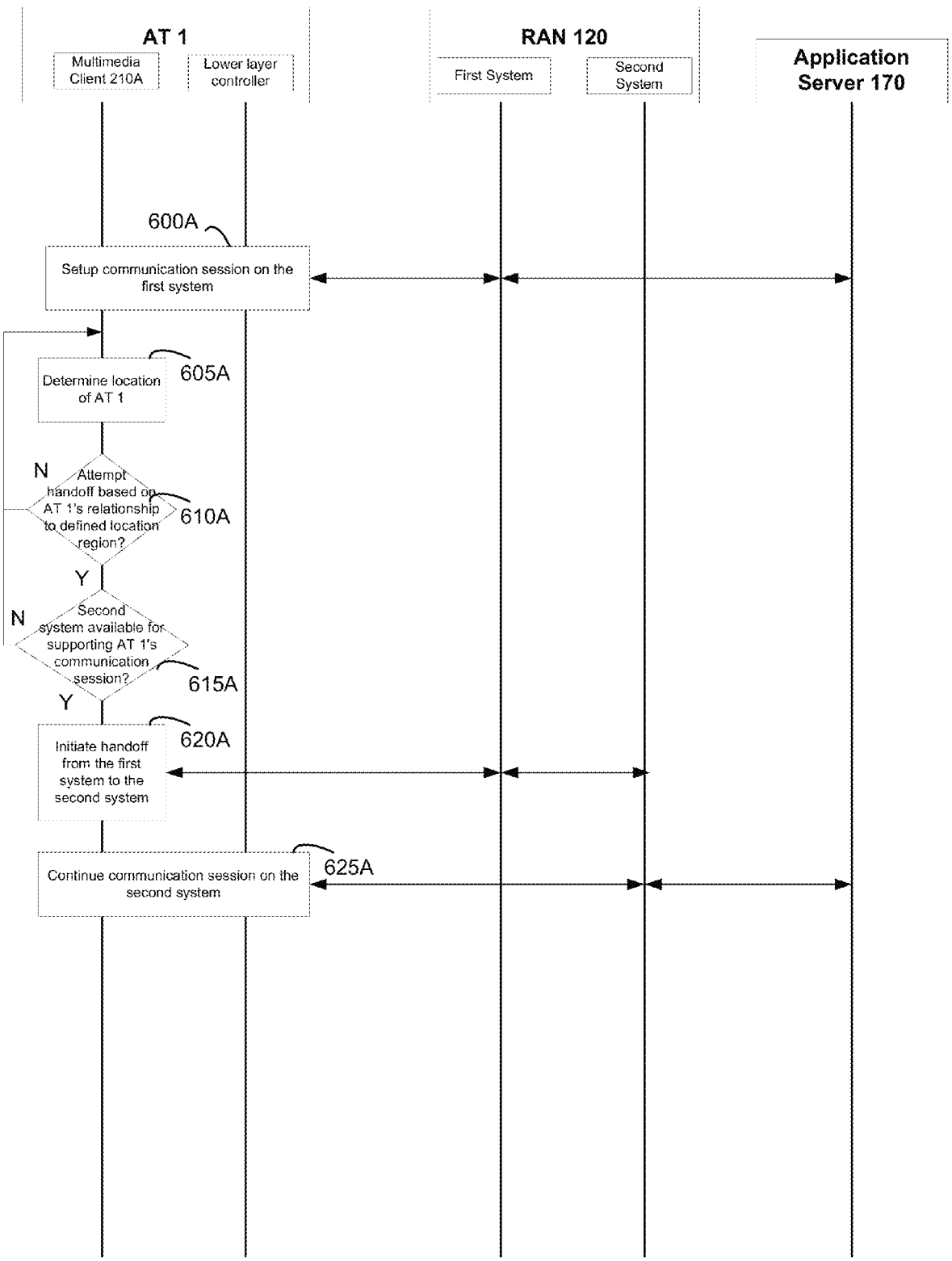
FIG. 6A illustrates the system-handoff process of FIG. 5 whereby one application-layer performance parameter corresponds to a location of the given access terminal within the wireless communications system in accordance with an embodiment of the invention.

FIG. 6A illustrates the system-handoff process of FIG. 5 whereby one application-layer performance parameter corresponds to a location of AT 1 within the wireless communications system 10 in accordance with an embodiment of the invention.

Referring to FIG. 6A, AT 1 sets up a communication session on the first system, 600A, as described above with respect to 500 of FIG. 5. In 605A, the multimedia client 210A determines location information associated with AT 1. The location information may correspond to a base station currently serving AT 1, a geographic coordinate of AT 1 (e.g., a GPS coordinate), and/or any other manner of identifying AT 1's location. In 610A, the multimedia client 210A compares AT 1's location information with a defined location region of the system 10. In an example, the defined location region corresponds to a list of sectors, such that if AT 1's current sector from 605A is in the list of sectors the multimedia client 210A can infer whether a particular system (e.g., unicast EV-DO, BCMCS, etc.) is available and/or permitted for use by AT 1. Defined location regions and methodologies for determining location information is described in more detail within co-pending U.S. Provisional Patent Application No. 61/163,834, entitled "REGULATING THE SCOPE OF SERVICE GEOGRAPHICALLY IN WIRELESS NETWORKS", filed on Mar. 26, 2009, assigned to the same assignee of the subject application, and hereby incorporated by reference in its entirety.

Accordingly, in the example of FIG. 6A, the one or more measured application-layer performance parameters includes some type of location information associated with AT 1. If the location comparison of 610A indicates that AT 1 is inside of or outside of the defined location region, the multimedia client 210A may determine whether to attempt a handoff to another system. For example, the defined location region may indicate sectors that are configured to support AT 1's communication session on the first system, such that if AT 1 now determines itself to be outside of the defined location region, the multimedia client 210A knows that a handoff to another system needs to be made or else the communication session is going to be dropped. In another example, the defined location region may indicate sectors where a more desirable system ("second system") than the first system is available for supporting AT 1's communication session. In a further example, the first system may correspond to BCMCS for supporting a group communication session via IP multicasting protocols within the EV-DO network of the RAN 120, and the second system may correspond to unicast EV-DO for supporting the group communication session via IP unicasting protocols within the EV-DO network of the RAN 120 (or vice versa).

Based on the relationship between AT 1's location information from 605A and the defined location region, the multimedia client 210A either continues to monitor the location of AT 1 during the communication session on the first system and returns to 605A, or else advances to 615A. In 615A, AT 1 determines whether a second system is available for supporting AT 1's communication session with a level of application-layer performance expected to be higher than the first system. In an example, the presence of the second system can be inferred from AT 1's relationship to the defined location region. If no second system is determined to be available for supporting AT 1's communication session in 615A, the process returns to 605A and AT 1 continues to monitor AT 1's location during the communication session on the first system. Otherwise, if the second system associated with a higher expected level of application-layer performance is determined to be available in 615A, the multimedia client 210A initiates or triggers the handoff of AT 1 from the first system to the second system, as is known in the art, 620A. After completing the handoff that is initiated in 620A, AT 1 continues the communication session on the second system, if possible, 625A. Accordingly, the embodiment of FIG. 6A illustrates one manner by which location of an access terminal can be used to determine when to perform inter-system handoffs of the access terminal.

Referring to FIG. 6A, each time AT 1 re-determines its location of AT 1 in 605A, the decision logic associated with blocks 610A and 615A may use AT 1's newly acquired location to determine whether or not to perform an inter-system handoff. In an example, each iteration of AT 1 determining its location can be timer-based (i.e., performed at a given period), or event based, or a combination thereof. In an example, events that may trigger AT 1 to determine its location may include a media-error-rate (MER) for the communication session on a current system rising above a threshold, when AT 1 hands off to a new cell or sector (e.g., such as when a Broadcast Multicast Service (BCMCS) flow status reported by AT 1 becoming unavailable as the AT enters a sector that does not broadcast the desired BCMCS flow) and/or any other potential event that has the potential to affect system performance and/or availability.

Figure 6B:
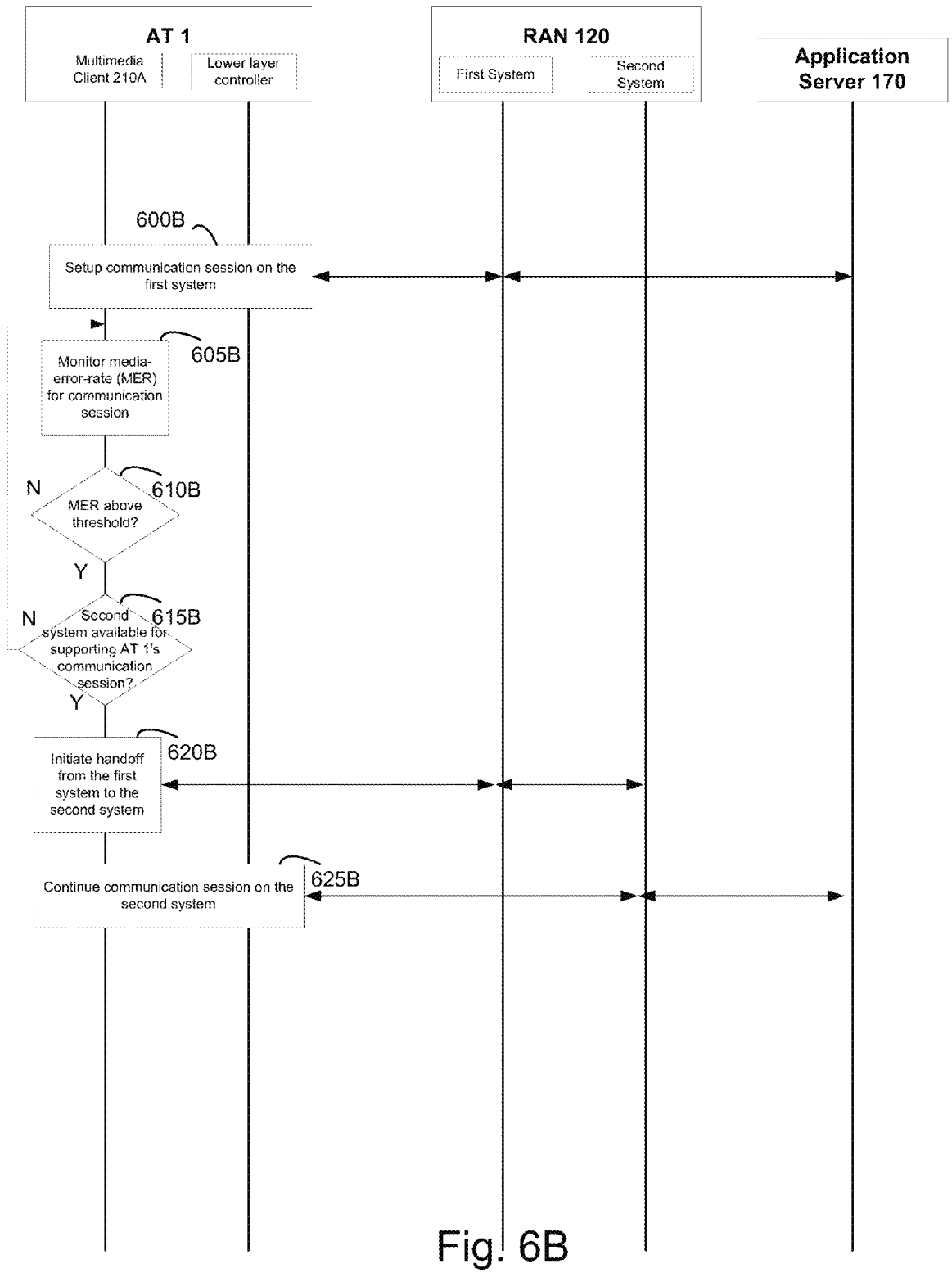
FIG. 6B illustrates the system-handoff process of FIG. 5 whereby one application-layer performance parameter corresponds to a media error rate (MER) for the given access terminal's communication session within the wireless communications system in accordance with an embodiment of the invention.

FIG. 6B illustrates the system-handoff process of FIG. 5 whereby one application-layer performance parameter corresponds to a media error rate (MER) for AT 1's communication session within the wireless communications system 10 in accordance with an embodiment of the invention.

Referring to FIG. 6B, AT 1 sets up a communication session on the first system, 600B, as described above with respect to 500 of FIG. 5. In 605B, the multimedia client 210A monitors the MER for the communication session on the first system. For example, the monitored MER may correspond to a time-averaged indication of the number of errors experienced by the multimedia client 210A. As will be appreciated by one of ordinary skill in the art, the MER differs from the FER because the FER is measured at the physical-layer, whereas the MER is measured at the application-layer. Thus, the MER is based on whether errors are experienced in the actual media being played by the multimedia client 210A on AT 1, for example, whereas the FER is based on frame-decoding errors of individual transport packets.

After determining the MER for the communication session on the first system in 605B, the multimedia client 210A compare AT 1's MER with an MER threshold, 610B. If AT 1's MER is determined to be lower than the MER threshold in 610B, the process returns to 605B and the multimedia client 210A continues to monitor the MER during the communication session on the first system. Otherwise, if AT 1's MER is determined to be greater than or equal to the MER threshold in 610B, AT 1 determines whether a second system is available for supporting AT 1's communication session with a level of application-layer performance expected to be higher than the first system, 615B. In the example of FIG. 6B, this means a system that is expected to provide a MER that is lower than the MER threshold, or at least lower than the MER associated with the first system for AT 1's communication session.

If no second system is determined to be available for supporting AT 1's communication session in 615B, the process returns to 605B and AT 1 continues to monitor the MER during the communication session on the first system. Otherwise, if the second system associated with a higher expected level of application-layer performance is determined to be available in 615B, the multimedia client 210A initiates or triggers the handoff of AT 1 from the first system to the second system, as is known in the art, 620B. After completing the handoff that is initiated in 620B, AT 1 continues the communication session on the second system, if possible, 625B. Accordingly, the embodiment of FIG. 6B illustrates one manner by which MER can be used to determine when to perform inter-system handoffs of the access terminal.

Figure 6C:
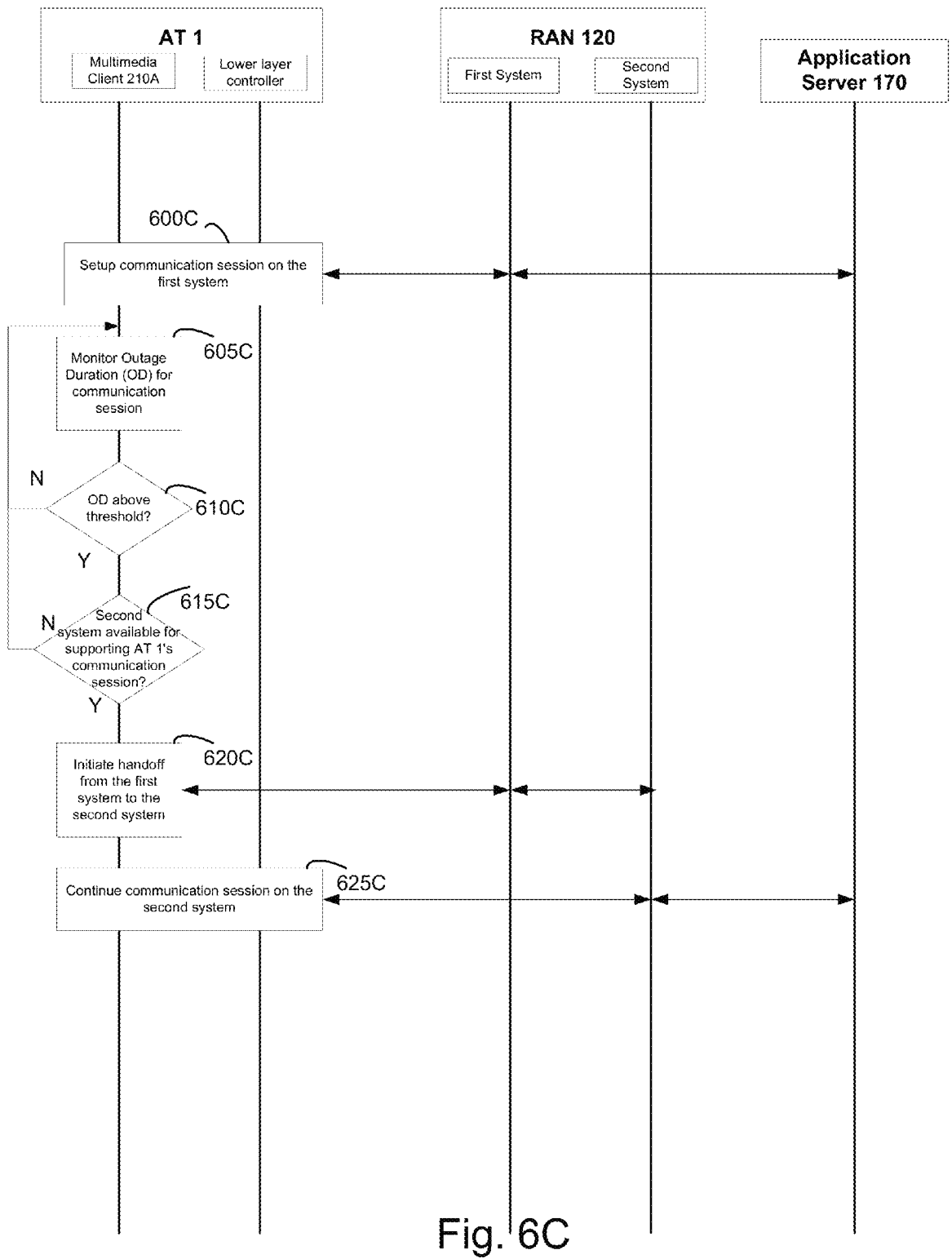
FIG. 6C illustrates the system-handoff process of FIG. 5 whereby one application-layer performance parameter corresponds to an outage duration for the given access terminal's communication session within the wireless communications system in accordance with an embodiment of the invention.

FIG. 6C illustrates the system-handoff process of FIG. 5 whereby one application-layer performance parameter corresponds to an outage duration for AT 1's communication session within the wireless communications system 10 in accordance with an embodiment of the invention.

Referring to FIG. 6C, AT 1 sets up a communication session on the first system, 600C, as described above with respect to 500 of FIG. 5. In 605C, the multimedia client 210A monitors the OD for the communication session on the first system. For example, the monitored OD may correspond to a period during which media associated with the communication session is not received from the first system of the RAN 120. In a further example, the OD may correspond to a timer that is reset after each successful application-layer media frame is output by multimedia client 210A (e.g., a video frame, an audio frame, etc.).

After determining the OD for the communication session on the first system in 605C, the multimedia client 210A compare AT 1's OD with an OD threshold, 610C. If AT 1's OD is determined to be lower than the OD threshold in 610C, the process returns to 605C and the multimedia client 210A continues to monitor the OD during the communication session on the first system. Otherwise, if AT 1's OD is determined to be greater than or equal to the OD threshold in 610C, AT 1 determines whether a second system is available for supporting AT 1's communication session with a level of application-layer performance expected to be higher than the first system, 615C. In the example of FIG. 6C, this means a system that is expected to provide an OD that is lower than the OD threshold, or at least lower than the OD associated with the first system for AT 1's communication session.

If no second system is determined to be available for supporting AT 1's communication session in 615C, the process returns to 605C and AT 1 continues to monitor the OD during the communication session on the first system. Otherwise, if the second system associated with a higher expected level of application-layer performance is determined to be available in 615C, the multimedia client 210A initiates or triggers the handoff of AT 1 from the first system to the second system, as is known in the art, 620C. After completing the handoff that is initiated in 620C, AT 1 continues the communication session on the second system, if possible, 625C. Accordingly, the embodiment of FIG. 6C illustrates one manner by which OD can be used to determine when to perform inter-system handoffs of the access terminal.

Figure 6D:
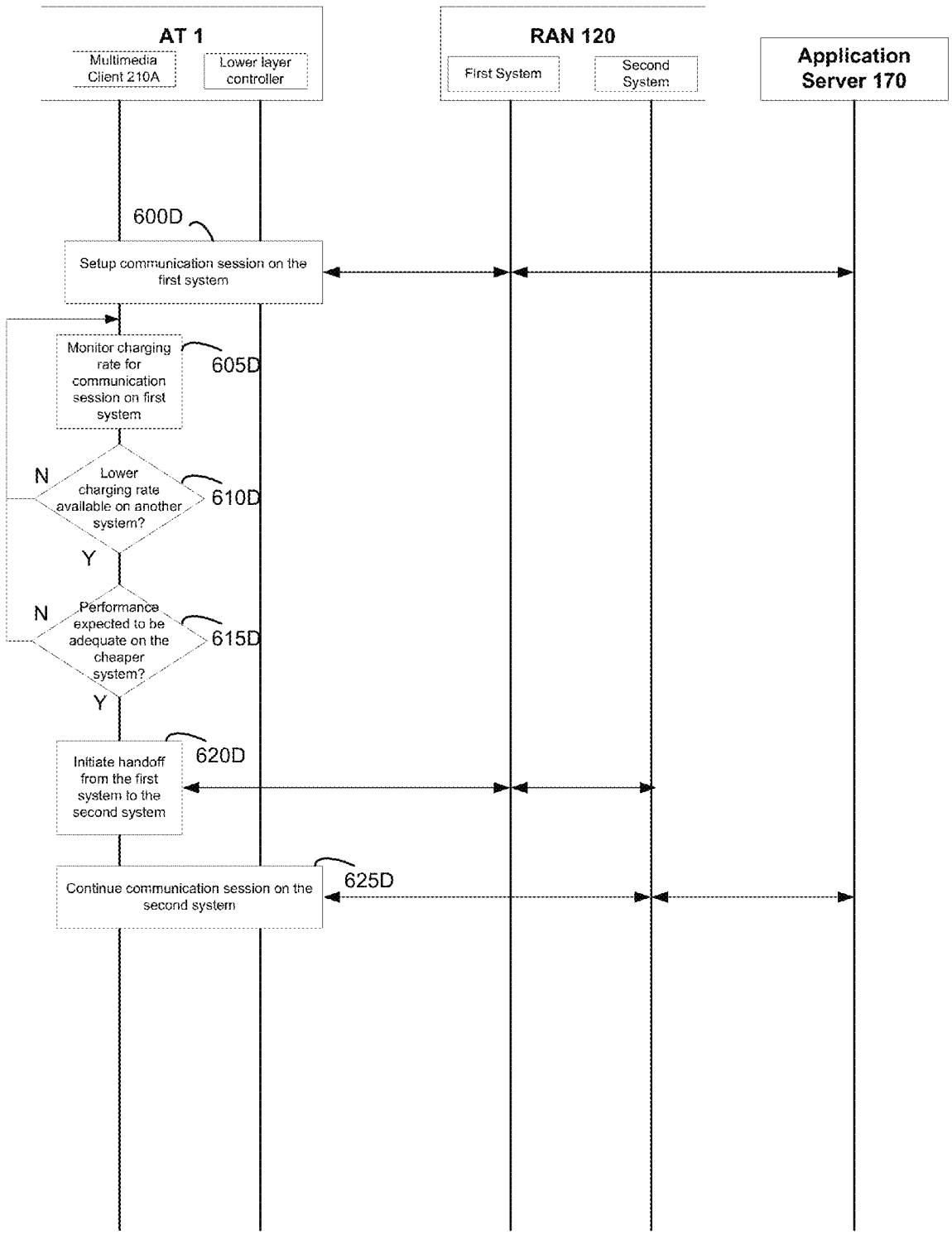
FIG. 6D illustrates the system-handoff process of FIG. 5 whereby one application-layer performance parameter corresponds to a current rate at which a subscriber using the given access terminal is being charged for service related to the given access terminal's communication session within the wireless communications system in accordance with an embodiment of the invention.

FIG. 6D illustrates the system-handoff process of FIG. 5 whereby one application-layer performance parameter corresponds to a current rate at which a subscriber using AT 1 is being charged for service related to AT 1's communication session within the wireless communications system 10 in accordance with an embodiment of the invention.

Referring to FIG. 6D, AT 1 sets up a communication session on the first system, 600D, as described above with respect to 500 of FIG. 5. In 605D, the multimedia client 210A monitors the current rate at which the subscriber using AT 1 is being charged for service related for the communication session on the first system. For example, if the first system corresponds to the subscriber's home WiFi network which is configured to provide unlimited service for a fixed rate, then the charging rate for AT 1's communication session on the first system may be interpreted as zero. In another example, if the first system corresponds to the subscriber's 1x cellular provider which is configured to provide a certain number of minutes and afterwards charge a fee-per-minute of usage, the charging rate for AT 1's communication session on the first system may be interpreted as either a monetary equivalent of a minute of usage or the fee-per-minute, dependent on how much usage the subscriber has incurred. As will be appreciated, different metering plans associated with system-connectivity mean that the monitored charging rate of 605D can correspond to any of various manners by which subscribers are charged for service.

After determining the charging rate for the communication session on the first system in 605D, the multimedia client 210A compare AT 1's charging rate with a charging rate threshold, 610D. If AT 1's charging rate is determined to be lower than the charging rate threshold in 610D, the process returns to 605D and the multimedia client 210A continues to monitor the charging rate during the communication session on the first system. Otherwise, if AT 1's charging rate is determined to be greater than or equal to the charging rate threshold in 610D, AT 1 determines whether a second system is available for supporting AT 1's communication session with a level of application-layer performance expected to be higher than the first system, 615D. In the example of FIG. 6D, this means a system that is expected to provide a charging rate that is lower than the charging rate threshold, or at least lower than the charging rate associated with the first system for AT 1's communication session. For example, if the second system is a BCMCS system that is broadcasting a certain multicast session that the AT has been monitoring in the first system using a dedicated channel (e.g., in EV-DO or 1x), the charging rate of the second system will be cheaper. In an example, the charging rate threshold need not actually be used, and the process of FIG. 6D can rather advance directly to FIG. 6D where AT 1's current charging rate is simply compared against the charging rate(s) of one or more other available systems.

If no second system is determined to be available for supporting AT 1's communication session in 615D, the process returns to 605D and AT 1 continues to monitor the charging rate during the communication session on the first system. Otherwise, if the second system associated with a higher expected level of application-layer performance is determined to be available in 615D, the multimedia client 210A initiates or triggers the handoff of AT 1 from the first system to the second system, as is known in the art, 620D. After completing the handoff that is initiated in 620D, AT 1 continues the communication session on the second system, if possible, 625D. Accordingly, the embodiment of FIG. 6D illustrates one manner by which charging rates can be used to determine when to perform inter-system handoffs of the access terminal.

In the embodiments of FIGS. 6A through 6D, handoffs between a first system and a second system are described as being based on different application-layer performance parameters. While each of FIGS. 6A through 6D are described with respect to one particular application-layer performance parameter, it will be appreciated that multiple application-layer performance parameters can be considered with regard to any system handoff decision at AT 1. For example, two or more of OD, MER, location and/or a current charging rate may be considered in a decision with regard to whether to handoff to another system, with a network operator or user of AT 1 establishing which application-layer performance parameter has priority over other parameters. Thus, if any of the designated application-layer performance parameters degrades during AT 1's communication session, a handoff to another system may potentially be triggered so long as superior performance is expected at least with the regard to the degraded parameter (e.g., with at least a threshold amount of performance expected for each other parameter of equal or higher priority than the degraded parameter).

Further, FIGS. 6A through 6D are each described with respect to two particular systems; namely, AT 1's current system ("first system") and a prospective system ("second system") under consideration for a potential handoff. However, it is possible that multiple systems are available for handoff from the first system. In this case, each available system may be evaluated during a handoff decision, as described below with respect to FIG. 6E.

Figure 6E:
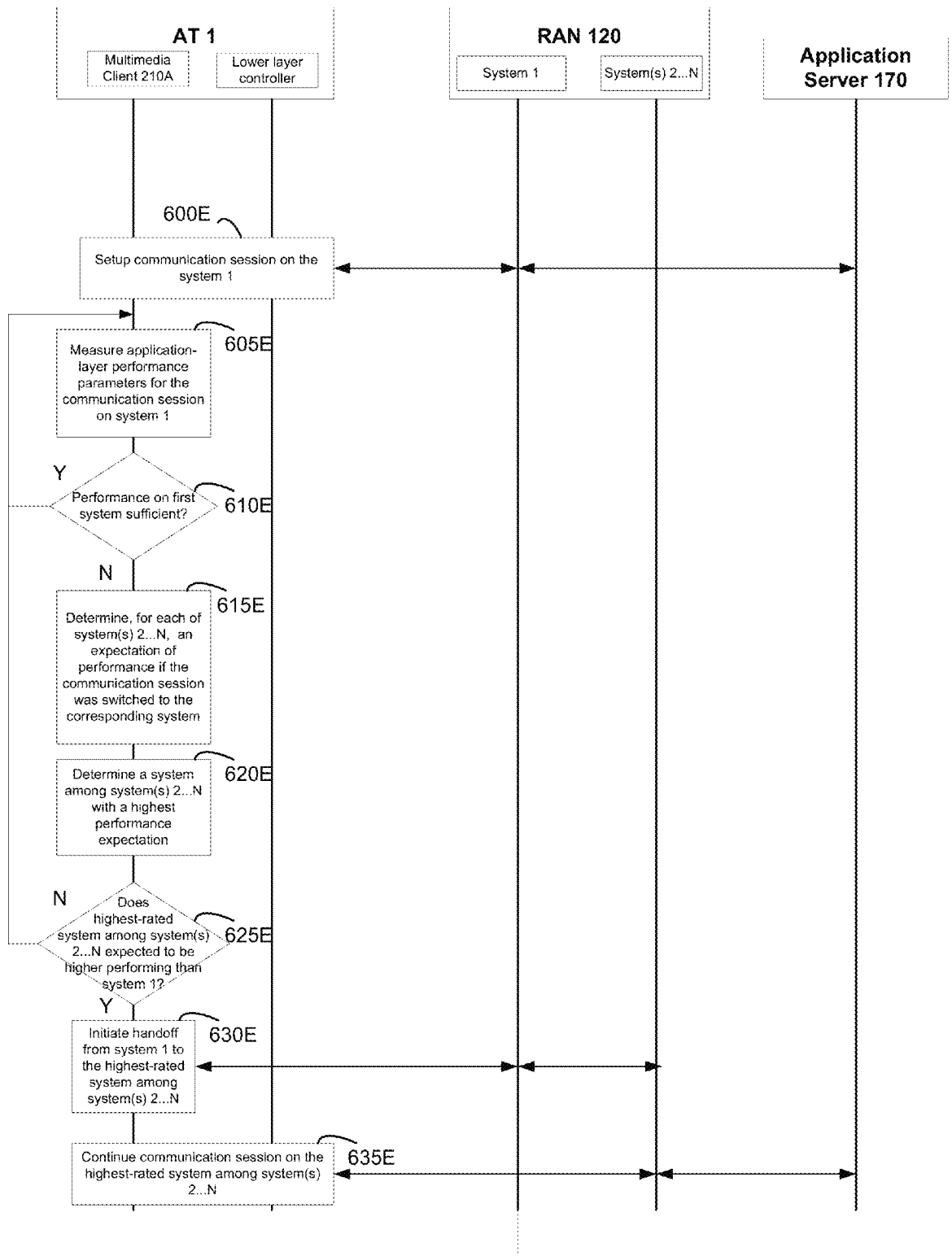
FIG. 6E illustrates the system-handoff process of FIG. 5 whereby one or more application-layer performance parameters are considered during a potential handoff of the given access terminal from a first system to one of a plurality of other potential systems during the given access terminal's communication session within the wireless communications system in accordance with an embodiment of the invention.

FIG. 6E illustrates the system-handoff process of FIG. 5 whereby one or more application-layer performance parameters are considered during a potential handoff of AT 1 from a first system (e.g., system 1) to one of a plurality of other potential systems (e.g., systems 2 . . . N, where N>2) during AT 1's communication session within the wireless communications system 10 in accordance with an embodiment of the invention.

Referring to FIG. 6E, AT 1 sets up a communication session on the first system, 600E, as described above with respect to 500 of FIG. 5. In 605E, the multimedia client 210A monitors one or more application-layer performance parameters for AT 1's communication session on the first system (e.g., OD, MER, charging rate, location, any combination thereof, etc.). After determining or measuring the one or more application-layer performance parameters for AT 1's communication session on the first system, the multimedia client 210A determines whether the determined parameters indicate that performance on the first system is sufficient for AT 1's communication session, 610E. If the first system is determined by the multimedia client 210A to provide adequate performance, the process returns to 605E and AT 1 continues to monitor the application layer performance parameters while the communication session continues on the first system. Otherwise, if the first system is determined by the multimedia client 210A not to provide adequate performance, the multimedia client 210A determines an expectation of performance for AT 1's communication session on each of a plurality of systems 2 . . . N, 615E. For example, if the application-layer performance parameters include a charging rate for the communication session, the multimedia client 210A can determine how much the subscriber using AT 1 would be charged on each of systems 2 ... N. In another example, if the application-layer performance parameters include AT 1's location, the multimedia client 210A can determine which of systems 2 ... n are available and/or a degree of performance based on AT 1's location, and so on.

In 620E, the multimedia client 210A determines a system among systems 2 ... N associated with a highest performance expectation. In an example, it is possible that a given system among systems 2 ... N has a higher performance expectation for one parameter and a lower performance expectation for another parameter. In this case, each performance parameter can be assigned a weight (e.g., as in an objective function) and a combined performance valuation can be computed, with the highest combined performance valuation corresponding to the system that is, overall, expected to provide a highest level of performance.

Next, in 625E, the multimedia client 210A determines whether the highest-rated system from 620E is expected to provide better performance than the first system that AT 1 is currently using for support of its communication session. If the highest-rated system among systems 2 ... N is not expected to provide better performance than the first system, the process returns to 605E and AT 1 continues to monitor the application layer performance parameters while the communication session continues on the first system. Otherwise, if the highest-rated system among systems 2 ... N is expected to provide better performance than the first system, the multimedia client 210A initiates or triggers the handoff of AT 1 from the first system to the highest-rated system among systems 2 ... N, as is known in the art, 630E. After completing the handoff that is initiated in 630E, AT 1 continues the communication session on its new system, if possible, 635E.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of operating an access terminal (AT) configured to participate in a communication session within a communications system, comprising:

participating in the communication session supported over a first system associated with a first physical layer;

monitoring application-layer performance parameters associated with the communication session over the first system, wherein the application-layer performance parameters include an outage duration (OD) during which no application-layer media frames are successfully received at the AT and a media error rate (MER) of the communication session that is measured by a client application of the AT at an application-layer;

determining, based at least in part on the monitoring, whether to hand off the communication session from the first system to a second system associated with a second physical layer; and selectively handing off the communication session from the first system to the second system based on the determining.

2. The method of claim 1, wherein the first system and/or the second system corresponds to one or more of a WiFi system, a CDMA2000 1x system, a Wideband CDMA (WCDMA) system, a frequency division multiple access (FDMA) system, a time division multiple access (TDMA) system, a orthogonal frequency division multiplexing (OFDM) system, a long-term evolution (LTE) system, a broadcast and multicast service (BCMCS) system and/or a multimedia broadcast/multicast services (MBMS) system.

3. The method of claim 1, wherein the application-layer performance parameters further include whether a location of the access terminal (AT) satisfies a given relationship with respect to a defined location region, and/or a charging rate associated with the communication session supported over the first system.

4. The method of claim 1, wherein the determining determines to hand off the communication session from the first system to the second system based in part on the monitoring and also based in part on an availability and/or application-layer performance expectation of the second system in the event of a handoff.

5. The method of claim 1, wherein the first and/or second systems supporting the communication session correspond to different connection mechanisms of an access network through which the AT communicates with an application server that is arbitrating the communication session between the AT and at least one other AT.

6. The method of claim 1, wherein the application-layer performance parameters further include whether a location of the AT satisfies a given relationship with respect to a defined location region.

7. The method of claim 6, wherein the monitoring includes:
determining the location of the AT;
comparing the determined location of the AT with the defined location region, the defined location region defining an area where the first system can support the communication session; and
attempting a handoff of the communication session from the first system to the second system if the comparison indicates that the determined location of the AT is not in the area where the first system can support the communication session.

8. The method of claim 7, wherein the attempting is only performed if the second system is determined to be available for a handoff.

9. The method of claim 8, wherein the attempting is only performed if an application-layer performance expectation of the second system is above a performance threshold.

10. The method of claim 7, wherein the attempting is only performed if a priority of a user of the access terminal (AT) is sufficient to permit using the second system for the communication session.

11. The method of claim 1, wherein the monitoring includes:
determining the MER during at least a portion of the communication session supported over the first system;
comparing the determined MER with a MER threshold; and
attempting a handoff of the communication session from the first system to the second system if the comparison indicates that the determined MER is above the MER threshold.

12. The method of claim 11, wherein the attempting is only performed if the second system is determined to be available for the handoff.

13. The method of claim 12, wherein the attempting is only performed if an application-layer performance expectation of the second system is above a performance threshold.

14. The method of claim 11, wherein the attempting is only performed if a priority of a user of the AT is sufficient to permit using the second system for the communication session.

15. The method of claim 1, wherein the monitoring includes:
determining the OD during at least a portion of the communication session supported over the first system;
comparing the determined OD with an OD threshold; and
attempting a handoff of the communication session from the first system to the second system if the comparison indicates that the determined OD is above the OD threshold.

16. The method of claim 15, wherein the attempting is only performed if the second system is determined to be available for the handoff.

17. The method of claim 16, wherein the attempting is only performed if an application-layer performance expectation of the second system is above a performance threshold.

18. The method of claim 15, wherein the attempting is only performed if a priority of a user of the AT is sufficient to permit using the second system for the communication session.

19. The method of claim 1, wherein the application-layer performance parameters further include a charging rate of the communication session supported over the first system.

20. The method of claim 19, wherein the monitoring includes:
determining the charging rate during at least a portion of the communication session supported over the first system;
comparing the determined charging rate with a charging rate threshold; and
attempting a handoff of the communication session from the first system to the second system if the comparison indicates that the determined charging is above the charging rate threshold.

21. The method of claim 20, wherein the attempting is only performed if the second system is determined to be available for a handoff.

22. The method of claim 20, wherein the charging rate threshold corresponds to a charging rate associated with conducting the communication session over the second system.

23. The method of claim 20, wherein the attempting is only performed if a priority of a user of the AT is sufficient to permit using the second system for the communication session.

24. The method of claim 1, wherein the determining includes:
if the monitoring indicates that the application-layer performance parameters are not sufficient, evaluating application-layer performance expectations associated with conducting the communication session on each of a plurality of systems other than the first system; and
if the evaluating indicates at least one of the plurality of systems is expected to provide better application-layer performance than the first system, selecting one of the plurality of systems as the second system.

25. The method of claim 1, wherein the selected system corresponds to a given system among a plurality of systems having a highest application-layer performance expectation.

26. The method of claim 1,
wherein the communication session over the first system is supported via a first Internet Protocol (IP) delivery scheme,
wherein the determining determines whether to hand off the communication session to a second IP delivery scheme that is supported by the second system, and
wherein the selectively handing off hands off the communication session from the first IP delivery scheme over the first system to the second IP delivery scheme over the second system based on the determining.

27. The method of claim 26, wherein the first IP delivery scheme corresponds to multicast and the second IP delivery scheme corresponds to unicast.

28. The method of claim 27,
wherein the second system is unicast Evolution-Data Optimized (EV-DO) or unicast Long-Term Evolution (LTE) or 1x or unicast Wideband Code Division Multiple Access (WCDMA), and
wherein the first system is broadcast and multicast service (BCMCS) or multimedia broadcast/multicast services (MBMS).

29. The method of claim 26,
wherein the first IP delivery scheme corresponds to unicast, and
wherein the second IP delivery scheme corresponds to multicast.

30. The method of claim 29,
wherein the first system is unicast Evolution-Data Optimized (EV-DO) or unicast Long-Term Evolution (LTE) or 1x or unicast Wideband Code Division Multiple Access (WCDMA), and
wherein the second system is broadcast and multicast service (BCMCS) or multimedia broadcast/multicast services (MBMS).

31. An access terminal configured to participate in a communication session within a communications system, comprising:
means for participating in the communication session supported over a first system associated with a first physical layer;
means for monitoring application-layer performance parameters associated with the communication session over the first system, wherein the application-layer performance parameters include an outage duration (OD) during which no application-layer media frames are successfully received at the AT and a media error rate (MER) of the communication session that is measured by a client application of the AT at an application-layer;
means for determining, based at least in part on the monitoring, whether to hand off the communication session from the first system to a second system associated with a second physical layer; and
means for selectively handing off the communication session from the first system to the second system based on the determination.

32. An access terminal configured to participate in a communication session within a communications system, comprising:
logic configured to participate in the communication session supported over a first system associated with a first physical layer;
logic configured to monitor application-layer performance parameters associated with the communication session over the first system, wherein the application-layer performance parameters include an outage duration (OD) during which no application-layer media frames are successfully received at the AT and a media error rate (MER) of the communication session that is measured by a client application of the AT at an application-layer;
logic configured to determine, based at least in part on the monitoring, whether to hand off the communication session from the first system to a second system associated with a second physical layer; and
logic configured to selectively hand off the communication session from the first system to the second system based on the determination.

33. A non-transitory computer-readable storage medium comprising program code, which, when executed by an access terminal configured to participate in a communication session within a communications system, causes the access terminal to perform operations, the program code comprising:
program code to participate in the communication session supported over a first system associated with a first physical layer;
program code to monitor application-layer performance parameters associated with the communication session over the first system, wherein the application-layer performance parameters include an outage duration (OD) during which no application-layer media frames are successfully received at the AT and a media error rate (MER) of the communication session that is measured by a client application of the AT at an application-layer;
program code to determine, based at least in part on the monitoring, whether to hand off the communication session from the first system to a second system associated with a second physical layer; and
program code to selectively hand off the communication session from the first system to the second system based on the determination.

* * * * *